Feb. 6, 1951 — C. W. INGELS — 2,540,527
THERMAL ALARM
Filed Sept. 8, 1948 — 2 Sheets-Sheet 1

Inventor
CLARENCE W. INGELS

By
Attorney.

Feb. 6, 1951 C. W. INGELS 2,540,527
THERMAL ALARM
Filed Sept. 8, 1948 2 Sheets-Sheet 2

Inventor
CLARENCE W. INGELS

By [signature]

Attorney.

Patented Feb. 6, 1951

2,540,527

UNITED STATES PATENT OFFICE 2,540,527

THERMAL ALARM

Clarence W. Ingels, St. Albans, N. Y.

Application September 8, 1948, Serial No. 48,230

10 Claims. (Cl. 177—311)

This invention relates to protective systems for electric equipment and more particularly to signalling means for indicating when the temperature of an electrical translating device is approaching a critical or dangerous value that may damage the device. The signalling means provided by this invention not only indicates when the equipment temperature has reached a predetermined value, somewhat lower than the critical value, but also indicates temperature changes above said predetermined temperature.

The advantages of such a signalling system are set forth in my copending application Serial No. 671,885, now United States Patent No. 2,455,011, to which reference is made for a detailed description of these advantages. This invention provides unique apparatus for obtaining results similar to those obtained by the apparatus described and claimed in the aforementioned application.

Accordingly, it is an object of this invention to provide novel signalling means for indicating when the temperature of an electrical translating device is at or above a predetermined temperature, lower than the critical temperature thereof.

It is another object of this invention to provide unique signalling means for indicating changes of the temperature of an electrical translating device above a predetermined temperature.

It is a further object of this invention to provide novel thermally responsive switching means for controlling the aforementioned signalling means.

Still another object of this invention is to provide thermally responsive switching means which not only controls signalling means, but also shuts off the power to or removes the load from an electrical translating device when the temperature thereof reaches a critical value.

Other objects and advantages of the invention will be apparent from the following description and accompanying drawings in which.

Figure 1:
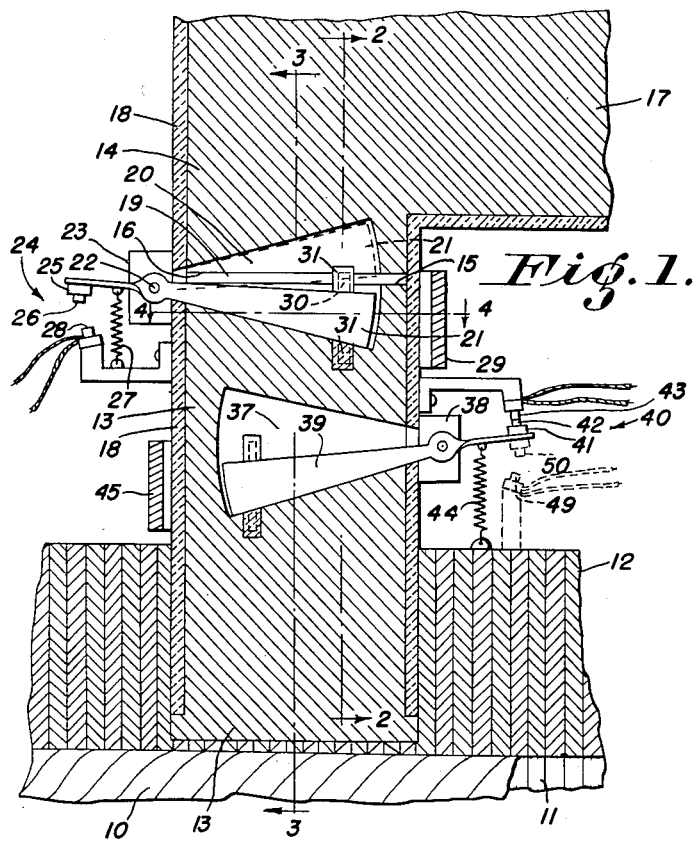
Figure 1 is a fragmentary sectional view showing the application of switching means embodying this invention to an electrical translating device.
Figure 2:
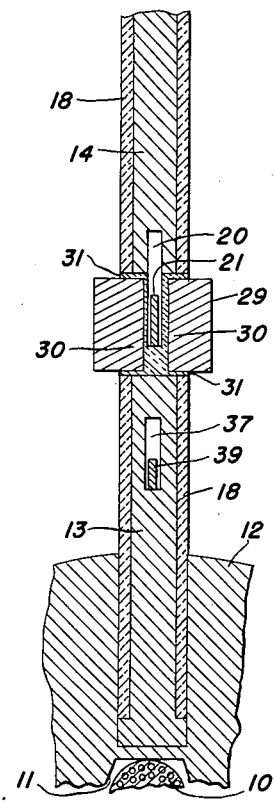
Figure 2 is a cross-sectional view taken on line 2—2 of Figure 1.
Figure 3:
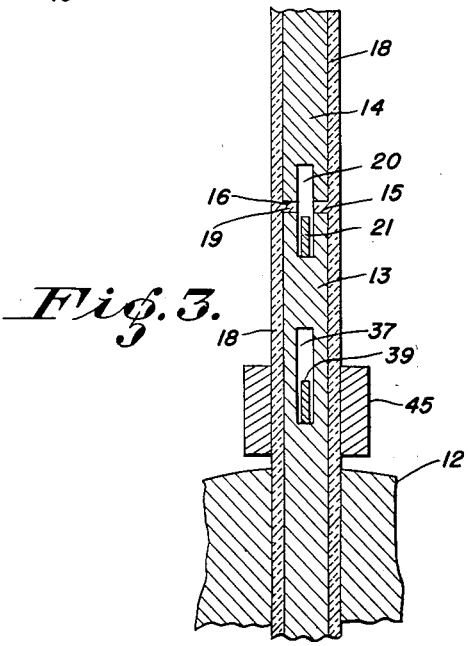
Figure 3 is a fragmentary cross-sectional view taken on line 3—3 of Figure 1.
Figure 4:
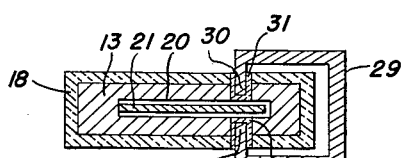
Figure 4 is a cross-sectional view taken on line 4—4 of Figure 1.

Referring first to Figure 1, there is shown a portion of the stator of a conventional three phase electric induction motor. Stator windings 10 are mounted in the usual slots 11 provided in the inner side of an annular laminated core 12. The current flowing through the stator windings 10 develops considerable heat which is fairly rapidly dissipated from the ends (not shown) of the windings which are exposed to the usual stream of cooling air. That portion of the windings 10, however, which is embedded in the core slots 11 more nearly reflects the absolute temperature of the windings and is not affected by ambient temperature variations. Accordingly, it is preferred to mount the temperature sensitive elements of this invention in such a manner that such elements are directly responsive to the temperature of the embedded portions of the windings.

Inserted in a suitable opening formed in the laminated core 12 and projecting above the outer surface thereof is a heating member 13 formed of material having high heat conductivity, such as copper. The member 13 extends into the core to within close proximity of the bottom of the slots 11, as shown, or, preferably, into good heat exchange contact with the insulated surface of the windings 10. Hence, the heating member 13 no only rapidly follows temperature variations of the windings, but also maintains substantially the same temperature as the windings.

Mounted above the heating member 13 is a heat dissipating or cooling member 14, also formed of material having high heat conductivity. The members 13 and 14 have juxtaposed faces 15 and 16, respectively, spaced a short distance apart. A portion 17 of the cooling member 14 extends axially of the motor and may have an end portion (not shown) projecting into the path of the cooling air for the motor. This construction of the cooling member is well illustrated, and an alternative construction described, in the aforementioned patent to which reference is again made for a more detailed description of the cooling member. Both members 13 and 14 are enclosed in a sheath of heat insulating material 18, except for the remotely positioned ends thereof. Heat insulation 19 also preferably is interposed in the space between the juxtaposed faces 15 and 16 of the members, as shown, to prevent radiant heat exchange therebetween.

From the construction thus far described, it will be seen that the projecting end of the heating member 13 attains substantially the same temperature as that of the embedded portion of the windings 10. This result obtains both because the heating member has high heat conductivity and because the heat insulating sheath 18 and the interposed heat insulation 19 prevent the upper end of the member 13 from losing heat. Similarly, the inner end of the cooling member 14 attains substantially the same temperature as the outer end thereof which is positioned in a cooling air stream. Hence, the inner end of the cooling member remains at a temperature substantially lower than that of the projecting end of the heating member, when the motor is running.

Figure 5:
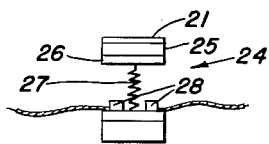
Figure 5 is a fragmentary side view of certain of the switch contacts shown in Figure 1.

A narrow slot 20 extends through the interposed insulation 19 and for substantially equal distances into each of the juxtaposed ends of the members 13 and 14. This slot 20 opens to the exterior of the members at one side thereof (to the left as shown in Figure 1). A narrow vane-like metallic element 21 is pivotally mounted on a pin 22 which is supported by brackets 23 positioned adjacent the slot opening. A major portion of the element 21 projects into the slot 20 for oscillatory movement therein, while the outer end of the element operates an electric switch, generally indicated by numeral 24. The switch operating end of the element 21 carries a strip of electrical insulation 25 on which is mounted an electrical contactor bar 26. A spring 27 urges the element 21 to pivot into a position (shown in dotted lines in Figure 1) in which the contactor bar 26 bridges a pair of electrically insulated switch points 28, best shown in Figure 5. The upper and lower ends of the slot 20 and the corresponding edges of the element 21 have similar configurations so that the element will make good heat exchange contact with either end of the slot. The width or thickness of the element 21 approximates the width of the slot 20, leaving only enough clearance between the side walls of the slot and the sides of the element to permit unhindered pivotal movement of the latter. Hence, the element 21, when in the switch opening, or lower, position, shown in solid lines in Figure 1, follows the temperature of the heating member 13 and, when in the switch closing, or upper position, follows the temperature of the cooling member 14.

The element 21, or at least that portion thereof disposed within the slot 20, is made of an alloy having a magnetic permeability which varies substantially inversely with the temperature. Certain iron-nickel alloys exhibit such magnetic characteristics. At a certain elevated temperature, depending upon the exact composition of the alloy, the alloy becomes substantially non-magnetic, i. e. the permeability is reduced to a point where a magnetic field of a given flux density will no longer exert an appreciable attractive force on the alloy. When the temperature of the alloy is reduced below the elevated temperature, the magnetic properties return with a consequent increase in permeability. This principle is utilized in the present invention.

A generally U-shaped permanent magnet 29 is provided with pole projections 30 which extend into suitable slots in the sides of the members 13 and 14 and present opposite plane pole surfaces almost flush with opposite sides of the slot 20.

Heat insulating material 31 is interposed between the inwardly extending pole portions 30 of the magnet 29 and the members 13 and 14, and also covers the opposed pole surfaces, to prevent heat exchange between the members through the magnet. The magnet 29 is so positioned that the magnetic field created thereby normally holds the element 21 in the lower, or switch opening, position with the bottom edge thereof in good heat exchange relation with the bottom of the slot 20. The material, from which the magnet 29 is made, has magnetic properties that are relatively unchanged by the temperatures encountered in use.

The strength of the magnet 29, i. e. the flux density of its field, the composition of the alloy from which the element 21 is made, and the strength of the spring 27 are so adjusted or proportioned, that when the temperature of the element 21 is at or above a predetermined value, the permeability of the element falls to a value where the attractive force exerted by the magnet is insufficient to hold the element in the lower or switch-open position against the pivoting force exerted by the spring 27. Accordingly, since the temperature of the element 21, when in normal position, closely and rapidly follows the temperature of the embedded portion of the windings 10, if the temperature of the latter reaches the aforementioned predetermined temperature, the element 21 rapidly pivots into the upper position, thus closing the switch 24. In this upper or switch-closed position, however, the element 21 is still within the range of the attractive force of the magnetic field created by the magnet 29.

In the upper position, the element 21 is rapidly cooled below the predetermined actuating temperature, because of its good heat exchange relation with the cooling member 14. When the temperature of the element 21 falls to the point where its permeability regains a value sufficient for the magnetic field or permanent magnet 29 to move the element against the action of the spring 27, the element rapidly pivots back into the lower position. This movement cycle of the element 21 is repeated as long as the temperature of the windings 10 is at or above the predetermined temperature. If the temperature of the windings increases above the predetermined temperature, which initiates movement of the element 21, the frequency of the operating cycle of the element will increase proportionally. This result follows because the higher the temperature of the heating member 13, the less time will be required to reheat the element 21 to its movement initiating temperature. Accordingly, the element will remain in the lower position for time periods which decrease with temperature increases, but remain in the upper position for time periods which are relatively constant. The temperature of the inner end of the cooling member 14 will increase slightly upon temperature increases of the heating member, but to an extent insufficient to have an appreciable effect on the above described operating cycle of the element 21.

Figure 6:
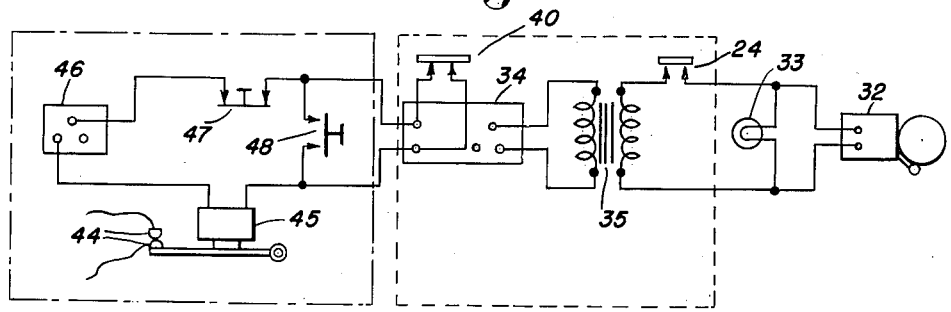
Figure 6 is a wiring diagram illustrating the application of this invention to an electric motor.
Figure 7:
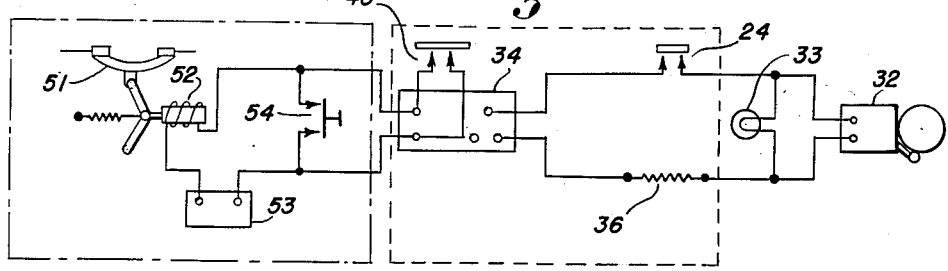
Figure 7 is a wiring diagram illustrating the application of this invention to an electric generator.

The signalling apparatus, controlled by the above described thermally responsive mechanism, is shown diagrammatically in the wiring diagrams of Figures 6 and 7. The signalling device may be either audible, such as a bell 32, visual, such as a lamp 33, or both. Both are shown for purposes of illustration. The bell 32 and lamp 33 are connected in parallel to a suitable source of electric power and the switch 24 is interposed in one of the power lines. The power may be taken directly from the terminal board 34 of the motor, using only two of the three terminals, as shown, or an independent source of electric energy, such as a battery (not shown) may be used. To step down the voltage for the lamp and the bell, when power therefor is taken from the terminal board 34, either a transformer 35 (Figure 6) or a suitable resistance 36 (Figure 7) may be used. That portion of Figure 6 enclosed by dotted lines indicates apparatus which may be located within or on the housing of a motor.

The operation of the signalling device is as follows: when the temperature of the windings of the motor reaches the predetermined temperature, below the critical temperature, the lamp is lighted intermittently and the bell is sounded intermittently. If the temperature of the windings increases above the predetermined temperature, the frequency of operation of the signals increases, i. e. the intervals of "dead" time between signals will decrease. The converse is true when the temperature decreases. Thus, the signals indicate temperature changes above the predetermined temperature. The advantages of such an indication to the operator of an electric motor or generator are described in detail in the aforesaid application.

The invention also includes automatic means for shutting off the power from the motor if the temperature of the windings reaches the critical or dangerous value. The automatic means employs a thermally responsive device for operating a safety switch, the device being a modification of the device employed for operating the signalling switch 24. The projecting end of the heating element 13 is provided with a slot 37 located below the slot 20. Pivotally mounted on brackets 38 and having a major portion projecting into the slot 37 is a second metallic element 39 having permeability characteristics similar to those of the first described element 21. The relative configurations of the slot 37 and the element 39 are substantially the same as those of the slot 20 and element 21, i. e. the edges of the element 39 make good heat exchange contact with the upper and lower ends of the slot 37 when the element is in the upper and lower positions, respectively. The outer end of the element 39 is adapted to operate an electric safety switch generally indicated at 40. This outer end of the element 39 carries a strip of electrical insulating material 41 mounting an electrical contactor bar 42 adapted to bridge a pair of switch points 43. A spring 44 normally urges the element into a position to open the switch.

A second permanent magnet 45, mounted similarly to the first magnet 29, provides a magnetic field adapted to normally hold the element 39 in the lower position to close the switch 40, as shown. The magnet 45 also is constructed of material having a permeability which is relatively unaffected by the operating temperatures to which the magnet is subjected in use. The field strength of the magnet 45, the composition of the alloy from which the element 39 is made, and the strength of the spring 44 are so proportioned that when the temperature of the element is at or above the critical temperature of the windings 10, the permeability of the element is reduced to a value where the attractive force of the magnet is insufficient to hold the element in the lower position against the action of the spring 44.

Accordingly, since the temperature of the element 39, when in normal position, closely and rapidly follows that of the windings, if the temperature of the latter reaches the critical value, the element rapidly pivots into the upper position, thus opening the safety switch 40. In the upper position, the element remains within the range of the attractive force of the magnet, but still maintains good heat exchange contact with the heating member 13. Hence, return movement of the element 39, into the lower position to close the switch 40, cannot take place until the temperature of the windings falls below the critical temperature.

Referring again to Figure 6, there is shown a wiring diagram for utilizing the safety switch 40. The dot-dash lines indicate apparatus which may be located in the motor control box. The main switch contacts 44 of the motor are held in closed position by the energization of a holding coil 45, which is shown as being connected to two of the terminals on the motor control terminal board 46, although any other suitable source of power may be used. The temperature responsive safety switch 40 and a manually operable cut-out or stopping switch 47 are connected in series with the coil 45. Connecting terminals may be mounted conveniently on the motor terminal board 34. If the temperature of the windings reaches or exceeds the critical temperature, the safety switch 40 is opened, thus deenergizing the holding coil 45 and opening the main switch contacts 44 to stop the motor.

A normally open starting switch 48 may be connected in parallel with the safety switch 40. After having removed the load, or other condition which brought about the actuation of the safety switch, the motor may be restarted by closing the starting switch 48 without waiting for the windings to cool sufficiently to close the safety switch. Such restarting of the motor will provide much more rapid cooling, by reason of the motor generated stream of cooling air, than if the motor were left to cool at rest.

Referring again to Figure 1, there is illustrated an alternative form of the safety switch 40 designed for use with a generator. In this modification, the safety switch 40 normally is open. Accordingly, switch points 49, shown in dotted lines, are adapted to be bridged by a contactor bar 50 mounted on that side of the outer end of the element 39 opposite the bar 42. The wiring diagram shown in Figure 7 shows the application of the safety switch 40 to remove the load from a generator. A circuit breaker 51 connected in the generator load has an actuating coil 52 connected in series with the safety switch 40 and a source of electric power. The latter is shown as terminals on the control terminal board 53 of the generator, although any other suitable source of power may be used. Upon actuation of the safety switch 40, the circuit breaker 51 is opened and the load removed from the generator. A normally open, manually operable switch 54 may be connected in parallel with the safety switch for manual actuation of the circuit breaker. The dotted lines of Figure 7 enclose apparatus which may be located within or on the generator housing, while the dot-dash lines enclose apparatus which may be located on the control terminal board of the generator.

It is apparent that various modifications of the specific apparatus shown and described may be made while retaining the basic principles of the invention. Furthermore, the invention has other applications than electrical equipment. For example, the invention may be utilized to give temperature indications of a bearing or of any cooling liquid which becomes heated in use. Accordingly, the invention embraces all modifications and embodiments which come within the spirit and scope of the following claims.

I claim:

1. A thermally responsive mechanism comprising: a heat conducting member; a movably mounted metallic element normally positioned in heat exchange relation with said member, said element having a magnetic permeability substantially inversely proportional to the temperature thereof and of a predetermined value at a predetermined temperature; means creating a magnetic field adapted to attract said element into said normal position; a cooling member normally maintained at a temperature lower than said predetermined temperature; means urging said element to move from said normal position, wherein said element is out of direct heat exchange relation with said cooling member, into an actuated position within the attractive range of said field and in heat exchange relation with said cooling member, said field being of a density insufficient to hold said element in said normal position against the action of said urging means when the permeability of said element is at or below said predetermined value, whereby when said heat conducting member is at or above said predetermined temperature said element is intermittently moved between said normal and actuated positions at a frequency which is a function of the temperature of said heat conducting member.

2. Thermally responsive electric switch means comprising: a pair of metallic members having high heat conductivity mounted end to end in spaced relationship, the opposite end of one of said members being adapted to be positioned in direct heat exchange relation with heat producing means and the opposite end of the other of said members being adapted to be positioned in cooling air; a metallic element mounted for movement between and substantially normal to the spaced ends of said members, said element having a magnetic permeability substantially inversely proportional to the temperature thereof and of a predetermined value at a predetermined temperature, and said element being normally positioned in heat exchange relation with said one member; an electric switch operable by said element; means creating a magnetic field adapted to attract said element into said normal position, resilient means urging said element to move from said normal position into an actuated position within the attractive range of said field and in heat exchange relation with said other member, said field being of a density insufficient to hold said element in said normal position against the action of said resilient means when the permeability of said element is at or below said predetermined value, whereby when the temperature of said one member is at or above said predetermined temperature said electric switch is intermittently operated at a frequency which is a function of the temperature of said one member.

3. The structure defined by claim 2 in which both members are encased in heat insulating material except for the opposite ends thereof.

4. The structure defined by claim 2 in which the opposed ends of the members are provided with a slot extending thereinto and the movable element comprises a thin vane mounted exteriorly of said members for pivotal movement within said slot.

5. The structure defined by claim 2 in which the opposed ends of the members are provided with a slot extending thereinto, the element comprises a thin vane movable within said slot, and said means creating the magnetic field being a generally U-shaped permanent magnet having opposed projections extending from both ends thereof into said members within close proximity of opposite sides of said vane.

6. The structure defined by claim 2 including a second element mounted in heat exchange relation to said one member and thermally responsive thereto, said element being responsive to a predetermined temperature higher than said first mentioned temperature, and an electric switch controlled by said second element.

7. Thermally responsive electric switch means comprising: a member having high heat conductivity adapted to be positioned in direct heat exchange with heat producing means; means defining a recess in said member; a metallic element mounted for movement in said recess, said element having a magnetic permeability substantially inversely proportional to the temperature thereof and of a predetermined value at a predetermined temperature; means creating a magnetic field adapted to attract said element into a first position in heat exchange relation with one wall of said recess; resilient means urging said element to move from said first position into a second position within the attractive range of said field and in heat exchange relation with another wall of said recess; and an electric switch operable by said element, the density of said field being insufficient to hold said element in said first position against the action of said resilient means when the permeability of said element is at or below said predetermined value, whereby said switch is in operated position as long as the temperature of said member is at or above said predetermined temperature.

8. Thermally responsive signalling means for indicating a predetermined temperature and temperature changes above said predetermined temperature comprising: a heat conducting member; a cooling member adapted to be maintained at a temperature lower than said predetermined temperature; a movably mounted metallic element normally positioned in heat exchange relation with said heat conducting member, said element having a magnetic permeability substantially inversely proportional to the temperature thereof and of a predetermined value at said predetermined temperature; means creating a magnetic field adapted to attract said element into said normal position; means urging said element to move from said normal position into an actuated position within the attractive range of said field and in heat exchange relation with said cooling member; electric switch means operable by said element and signalling means controlled by said switch means, the density of said field being insufficient to hold said element in said normal position against the action of said urging means when the permeability of said element is at or below said predetermined value, whereby when said heat conducting member is at or above said predetermined temperature said signalling means is intermittently operated at a frequency which is a function of the temperature of said heat conducting member.

9. Thermally responsive signalling means for indicating a predetermined temperature of the windings of an electrical translating device lower than the critical temperature thereof and for